United States Patent
Kotola et al.

(10) Patent No.: US 7,263,345 B2
(45) Date of Patent: Aug. 28, 2007

(54) SYSTEM AND METHOD FOR REMOTE SERVICE INFORMATION

(75) Inventors: Sakari Kotola, Kauniainen (FI); Teppo Savinen, Vihti (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/801,598

(22) Filed: Mar. 17, 2004

(65) Prior Publication Data

US 2005/0208892 A1  Sep. 22, 2005

(51) Int. Cl.
*H04B 1/38* (2006.01)
*H04B 7/22* (2006.01)
*H04M 1/00* (2006.01)

(52) U.S. Cl. .................. 455/403; 455/41.2; 455/414.3; 455/556.2; 455/566

(58) Field of Classification Search ................ 709/202, 709/203; 455/3.03–3.06, 414.1–414.3, 414.4, 455/41.2–41.3, 515, 466, 412.1, 514, 556.1–556.2, 455/566

See application file for complete search history.

(56) References Cited

U.S. PATENT DOCUMENTS

| | | | |
|---|---|---|---|
| 5,251,251 A | 10/1993 | Barber et al. | |
| 5,819,039 A * | 10/1998 | Morgaine | 709/217 |
| 6,112,103 A | 8/2000 | Puthuff | |
| 6,198,941 B1 | 3/2001 | Aho et al. | |
| 6,219,696 B1 * | 4/2001 | Wynblatt et al. | 709/218 |
| 6,532,368 B1 | 3/2003 | Hild et al. | |
| 6,591,266 B1 * | 7/2003 | Li et al. | 707/10 |
| 6,631,269 B1 | 10/2003 | Cave | |
| 6,633,757 B1 | 10/2003 | Hermann et al. | |
| 6,657,713 B2 | 12/2003 | Hansen | |
| 6,757,715 B1 | 6/2004 | Philyaw | |
| 6,765,474 B2 * | 7/2004 | Eaton et al. | 340/7.43 |
| 6,909,721 B2 | 6/2005 | Ekberg et al. | |
| 6,981,210 B2 * | 12/2005 | Peters et al. | 715/511 |
| 7,028,032 B1 * | 4/2006 | Diedrich et al. | 707/10 |
| 7,158,176 B2 | 1/2007 | Tokkonen et al. | |
| 2002/0039367 A1 | 4/2002 | Seppala et al. | |
| 2002/0044549 A1 | 4/2002 | Johansson et al. | |
| 2002/0073204 A1 | 6/2002 | Dutta et al. | |

(Continued)

FOREIGN PATENT DOCUMENTS

EP  1 207 707 A1  5/2002

(Continued)

OTHER PUBLICATIONS

U.S. Appl. No. 11/067,764, filed Mar. 1, 2005, Martin Zilliacus et al.

(Continued)

*Primary Examiner*—Simon Nguyen
(74) *Attorney, Agent, or Firm*—Morgan & Finnegan LLP (57) ABSTRACT

Service links corresponding to services provided by remote service providers are received. These links may be from a short-range wireless communications network. A previously stored remote service link may be replaced with the received remote service link when a maximum number of stored service links is reached. Also, the received remote service link may replace an earlier stored service link when a identifier corresponding to the received remote service link is the same as an identifier corresponding to the earlier stored remote service link. Representations of remote service links may be displayed, for example, in the form of graphical icons.

41 Claims, 9 Drawing Sheets

U.S. PATENT DOCUMENTS

| | | |
|---|---|---|
| 2002/0120750 A1 | 8/2002 | Nidd |
| 2002/0123360 A1* | 9/2002 | Vikman et al. ............. 455/466 |
| 2002/0124046 A1 | 9/2002 | Fischer et al. |
| 2002/0129170 A1 | 9/2002 | Moore et al. |
| 2002/0160758 A1* | 10/2002 | Pradhan et al. ............. 455/414 |
| 2002/0160793 A1* | 10/2002 | Pradhan et al. ............. 455/466 |
| 2002/0178215 A1 | 11/2002 | Lacksono et al. |
| 2002/0188657 A1 | 12/2002 | Traversat et al. |
| 2003/0013483 A1* | 1/2003 | Ausems et al. ............. 455/556 |
| 2003/0037033 A1 | 2/2003 | Nyman et al. |
| 2003/0054806 A1 | 3/2003 | Ho et al. |
| 2003/0061364 A1 | 3/2003 | Banerjee et al. |
| 2003/0069016 A1 | 4/2003 | Bahl et al. |
| 2003/0078062 A1 | 4/2003 | Burr |
| 2003/0110218 A1* | 6/2003 | Stanley ....................... 709/204 |
| 2003/0115415 A1 | 6/2003 | Want et al. |
| 2003/0131059 A1* | 7/2003 | Brown et al. ............... 709/206 |
| 2003/0207683 A1* | 11/2003 | Lempio et al. .......... 455/422.1 |
| 2003/0208522 A1* | 11/2003 | McDonnell et al. ........ 709/201 |
| 2003/0228842 A1* | 12/2003 | Heinonen et al. .......... 455/41.2 |
| 2004/0002385 A1 | 1/2004 | Nguyen |
| 2004/0009750 A1 | 1/2004 | Beros et al. |
| 2004/0015403 A1 | 1/2004 | Moskowitz et al. |
| 2004/0043770 A1* | 3/2004 | Amit et al. .................. 455/450 |
| 2004/0063498 A1 | 4/2004 | Oakes et al. |
| 2004/0063980 A1 | 4/2004 | Raths et al. |
| 2004/0075675 A1* | 4/2004 | Raivisto et al. ............. 345/700 |
| 2004/0087274 A1 | 5/2004 | Ekberg et al. |
| 2004/0114557 A1 | 6/2004 | Bryan et al. |
| 2004/0171378 A1* | 9/2004 | Rautila ....................... 455/419 |
| 2004/0224706 A1* | 11/2004 | Lorello et al. ............... 455/466 |
| 2004/0225712 A1* | 11/2004 | Tajima et al. ................ 709/201 |
| 2005/0058108 A1 | 3/2005 | Blount |
| 2005/0058109 A1 | 3/2005 | Ekberg |
| 2005/0059379 A1 | 3/2005 | Sovio et al. |
| 2005/0114756 A1* | 5/2005 | Lehikoinen et al. ..... 715/501.1 |
| 2005/0185660 A1 | 8/2005 | Ekberg et al. |
| 2005/0239494 A1* | 10/2005 | Klassen et al. .......... 455/550.1 |
| 2006/0058011 A1* | 3/2006 | Vanska et al. ........... 455/414.3 |

FOREIGN PATENT DOCUMENTS

| | | |
|---|---|---|
| EP | 1 242 986 B1 | 9/2002 |
| EP | 1 253 540 A2 | 10/2002 |
| EP | 1246487 A2 | 10/2002 |
| EP | 1392023 A2 | 2/2004 |
| EP | 1 505 811 A1 | 2/2005 |
| GB | 2410153 A | 7/2005 |
| JP | 2003/016347 A | 1/2003 |
| WO | WO99/41876 | 8/1999 |
| WO | WO 00/72506 A1 | 11/2000 |
| WO | WO 01/31960 | 5/2001 |
| WO | WO 01/45319 | 6/2001 |
| WO | WO 03/034664 | 4/2003 |
| WO | WO 03/055150 A2 | 7/2003 |
| WO | WO 03/055238 A1 | 7/2003 |
| WO | WO 04/038541 A2 | 5/2004 |
| WO | WO 2004/091143 A2 | 10/2004 |
| WO | WO 2006/092688 A2 | 9/2006 |

OTHER PUBLICATIONS

U.S. Appl. No. 11/125,273, filed May 10, 2005, Outi Markki et al.

"Assigned Numbers", article [online], Bluetooth SIG, Inc., 1999-2001 [2 pages retrieved on Sep. 3, 2003]. Retrieved from the Internet: <http://www.bluetoothsig.org/assigned-numbers/>.

"Assigned Numbers—Bluetooth Baseband", article [online], Bluetooth SIG., Inc. 1999-2001 [7 pages retrieved on Sep. 3, 2003]. Retrieved from the Internet <http://www.bluetoothsig.org/assigned-numbers/baseband.htm>.

"Assigned Numbers—Link Manager Protocol (LMP)", article [online], Bluetooth SIG, Inc. 1999-2001 [1 page retrieved on Sep. 3, 2003]. Retrieved from the Internet <http://www.bluetoothsig.org/assigned-numbers/lmp.htm>.

"Assigned Numbers—Logical Link Control and Adaptation Protocol (L2CAP)", article [online], Bluetooth SIG., Inc. 1999-2001 [2 pages retrieved on Sep. 3, 2003]. Retrieved from the Internet <http://www.bluetoothsig.org/assigned-numbers/12cap.htm>.

"Assigned Numbers—Service Discovery Protocol (SDP)", article [online], Bluetooth SIG., Inc. 1999-2001 [11 pages retrieved on Sep. 3, 2003]. Retrieved from the Internet <http://www.bluetoothsig.org/assigned-numbers/sdp.htm>.

"Assigned Numbers—Service Discovery Protocol (SDP)", article [online], Bluetooth SIG., Inc. 1999-2001 [5 pages retrieved on Sep. 3, 2003]. Retrieved from the Internet <http://www.bluetoothsig.org/assigned-numbers/host.htm>.

"Assigned Numbers—Company Identifiers", article [online], Bluetooth SIG., Inc. 1999-2001 [3 pages retrieved on Sep. 3, 2003]. Retrieved from the Internet <http://www.bluetoothsig.org/assigned-numbers/company.htm>.

"Assigned Numbers—References", article [online], Bluetooth SIG., Inc. 1999-2001 [6 pages retrieved on Sep. 3, 2003]. Retrieved from the Internet <http://www.bluetoothsig.org/assigned-numbers/tail.htm>.

"All About ISOC", web page [online], Internet Society, 2002 [2 pages retrieved on Oct. 23, 2003]. Retrieved from the Internet: <http://www.isoc.org/isoc/>.

"All About ISOC: Conferences—NDSS", web page [online], Internet Society, 2002 [1 page retrieved on Oct. 23, 2003]. Retrieved from the Internet: <http://www.isoc.org/isoc/conferences/ndss/>.

"Internet Society (ISOC): All About The Internet", web page [online], Internet Society, 2002 [1 page retrieved on Oct. 23, 2003]. Retrieved from the Internet: <http://www.isoc.org/isoc/conferences/ndss/02/>.

"NDSS Conference Proceedings: 2002", web page [online], Internet Society [2 pages retrieved on Oct. 23, 2003]. Retrieved from the Internet: <http://www.isoc.org/isoc/conferences/ndss/02/proceedings/>.

Balfanz et al. "Talking to Strangers: Authentication in Ad-Hoc Wireless Networks", Xerox Palo Alto Research Center, (Date Unknown), 13 pages.

Kammer et al., "Bluetooth Application Developer's Guide: The Short Range Interconnect Solution", Syngress Publishing, Inc., 2002, pp. 1-68.

Bobba et al., Bootstrapping Security Associations for Routing in Mobile Ad-Hoc Workstations, IEEE Global Telecommunications Conference Proceedings; San Francisco, CA Dec. 1-5, 2003, IEEE Global Telecommunications Conference Proceedings, NY, NY: IEEE US, vol. 7 of 7; Dec. 1, 2003; pp. 1511-1513; GLOBCOM 2003; ISBN: 0-7803-7974-8.

"Windows NT Workstation"; Nov. 2, 2003; pp. 1-14; XP002323988; Retrieved from Internet: www.meetsoon.com/sid3.html; Apr. 11, 2005.

Kolsi et al.; "MIDP 2.0 Security Enhancements" System Sciences, 2004; Proceedings of the 37 Annual Hawaii International Conference on Jan. 5-8, 2004, Piscataway, NJ; IEEE, Jan. 5, 2004, pp. 287-294, XP010682881; ISBN: 0-7695-2056-1.

U.S. Appl. No. 11/142,766, filed May 31, 2005, Kotola.

\* cited by examiner

| Service name 602 | Service category 616 |
| Icon 604 | Primary link type 617 |
| Description 606 | Link information 618<br>Telephony (number)<br>SMS (template & number)<br>WAP (URL)<br>HTML (URL) |
| Service provider identifier 608 | |
| Validity information 610 | |
| Download time 612 | Price per link information 620 |
| Download place 614 | Service number 622 |

SYSTEM AND METHOD FOR REMOTE SERVICE INFORMATION

FIELD OF THE INVENTION

The present invention relates to wireless communications. More particularly, the present invention relates to techniques involving the access of information services across wireless networks.

BACKGROUND OF THE INVENTION

Wireless communications devices can be used to obtain services from remote devices. These services may provide location-specific information regarding topics, such as weather forecasts, local dining and shopping, maps, transit schedules, etc. Various technologies, such as cellular and short-range networking technologies, may be employed in the retrieval of such services.

Examples of short-range networking technologies include Bluetooth and wireless local area networks (WLAN). Bluetooth provides a short-range radio network, originally intended as a cable replacement. It can be used to create ad hoc networks of up to eight devices, where one device is referred to as a master device. The other devices are referred to as slave devices. The slave devices can communicate with the master device and with each other via the master device. The devices operate in the 2.4 GHz radio band reserved for general use by Industrial, Scientific, and Medical (ISM) applications. Bluetooth devices are designed to find other Bluetooth devices within their communications range and to discover what services they offer.

WLANs are local area networks that employ high-frequency radio waves rather than wires to exchange information between devices. IEEE 802.11 refers to a family of WLAN standards developed by the IEEE.

Other short-range technologies are also applicable for the exchange of information at higher data rates. Ultra wideband (UWB) is an example of such a higher data rate technology. There are many UWB transmission techniques One UWB technique is called impulse radio (IR). In IR, data is transmitted by employing short baseband pulses that are separated in time by gaps. Thus, IR does not use a carrier signal. These gaps makes IR much more immune to multipath propagation problems than conventional continuous wave radios. RF gating is a particular type of IR in which the impulse is a gated RF pulse. This gated pulse is a sine wave masked in the time domain with a certain pulse shape.

A mobile device may store and display information that allows a user to initiate service sessions with various remote service providers. To reduce the amount of user interaction required for session initiation, the device's user interface may provide such information in the form of links. Because such services often pertain to particular locations, a device may collect a large amount of service related information over of relatively short period of time. Accordingly, techniques are needed for the storage and management of such information.

SUMMARY OF THE INVENTION

The present invention provides techniques for the management of information regarding remote services. Accordingly a method and system of the present invention receives a remote service link across a short-range wireless communications network. The received remote service link corresponds to a service provided by a remote service provider. When a maximum number of stored service links is reached, the system and method deletes a previously stored remote service link. At this point, the received remote service link may be stored.

A further system and method of the present invention receives a remote service link and an identifier corresponding to the remote service link across a short-range wireless communications network. When the identifier corresponding to the received remote service link is the same as an identifier corresponding to the earlier stored remote service link, the system and method replace an earlier stored remote service link with the received remote service link.

The above system and methods may display a representation of the received remote service link. This representation may be, for example, an icon for display by a graphical user interface.

The present invention also provides computer program products. These computer program products include a computer useable medium having computer program logic recorded thereon. The computer program logic for instructing a processor in a wireless communications device to perform features of the methods and systems described above.

In addition, the present invention provides a display for a wireless communications device. The display includes a dynamic menu, a recent menu, and a saved menu. The dynamic menu is for displaying representations of at least one remote service link received across a short-range wireless communications. The recent menu is for displaying representations of at least one remote service link that was used to establish a communications session with a remote service provider, wherein the communications session employs a cellular communications network. The saved menu is for displaying representations of at least one remote service link that was selected for storage by a user.

Further features and advantages of the present invention will become apparent from the following description, claims, and accompanying drawings.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein.

DETAILED DESCRIPTION OF THE PREFERRED EMBODIMENTS

I. Operational Environment

Figure 1:
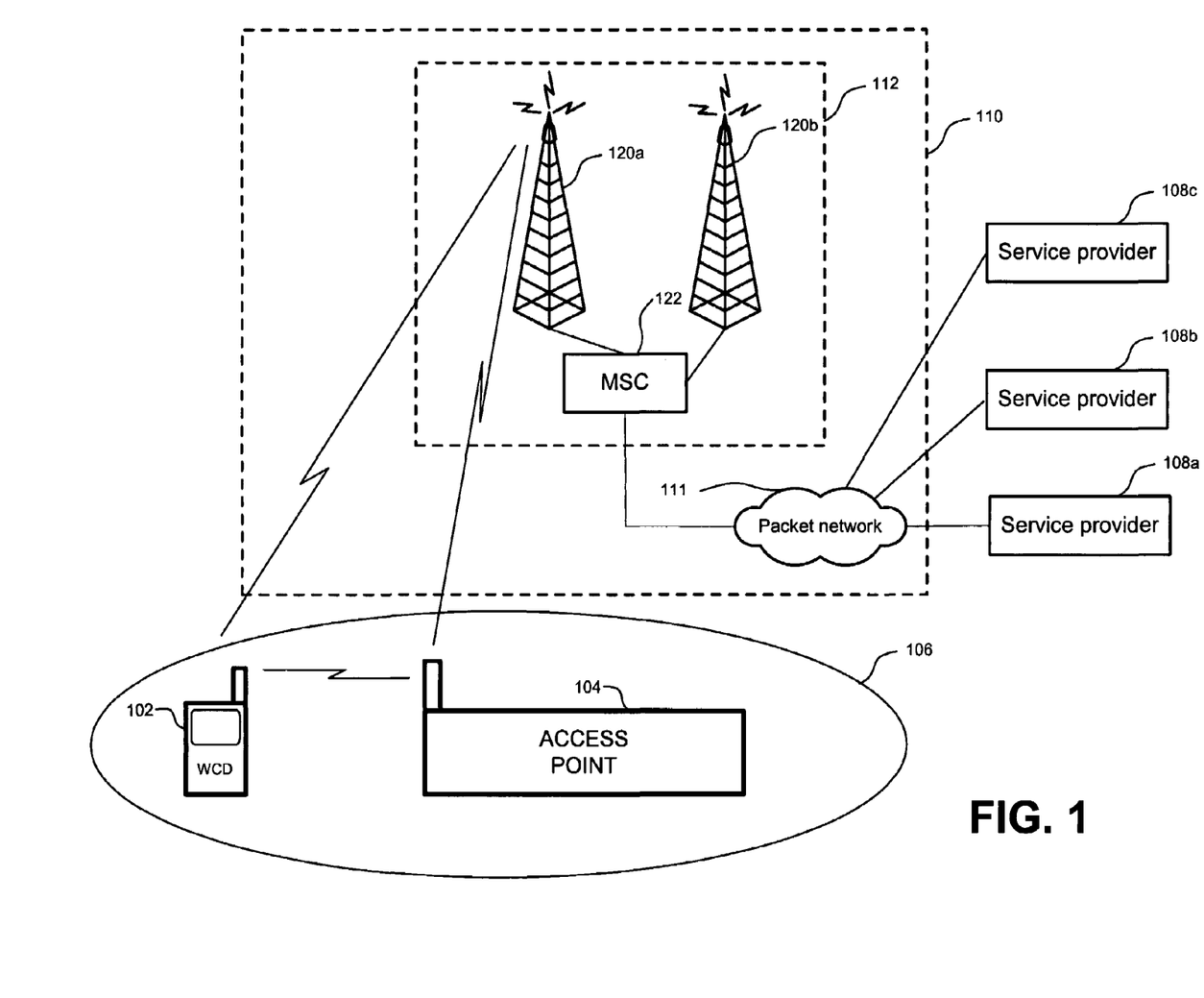
FIG. 1 is a diagram of an exemplary operational environment.

Before describing the invention in detail, it is helpful to describe an environment in which the invention may be used. Accordingly, FIG. 1 is a diagram of an exemplary operational environment in which a wireless communications device (WCD) 102 may collect and consume services according to techniques of the present invention.

WCD 102 is capable of engaging in various types of wireless communications. For instance, WCD 102 may engage in short-range communications, as well as longer range (e.g., cellular) communications. Examples of short-range communications include Bluetooth, WLAN (i.e., IEEE 802.11), and/or ultra wideband (UWB) transmission. As shown in FIG. 1, WCD 102 may enter within communications range of an access point 104. This communications range is defined by a coverage area 106, which determines the locations at which these devices may communicate.

When WCD 102 is within coverage area 106 of access point 104, it may enter into a short-range communications connection with access point 104. Once this connection is established, access point 106 may provide information to WCD 102 regarding various services that are available within these areas. This information may include one or more links to such services. These links may be transmitted to WCD 102 in arrangements or data structures that are referred to herein as service bookmarks. Details regarding an exemplary service bookmark are described below with reference to FIG. 6.

In addition, WCD 102 is capable of employing radio frequency identification (RFID) communications with access point 104. For such communications, access point 104 includes a transponder, which provides remote service links (e.g., service bookmarks) to WCD 102 in response to a transmission by WCD 102. Such communications may occur at a very close proximity (e.g., almost touching). Accordingly, for RFID communications, coverage area 106 may span a few feet.

In such RFID implementations, access point 104 may include one or more RFID tags. Thus, a user of WCD 102 may actively choose a preferred link (e.g., service bookmark) by selecting a corresponding RFID tag. The selected RFID tag may provide the link information directly. Alternatively, the selected RFID tag may provide necessary information for the terminal to fetch corresponding link information from the access point across another short-range (e.g., Bluetooth, WLAN, and/or UWB) connection.

Various service providers 108 provide these services. In the environment of FIG. 1, WCD 102 communicates with service providers 108 across a backbone network 110. FIG. 1 shows that backbone network 110 includes a packet-based network 111 (e.g., the Internet) and a cellular network 112. Cellular network 112 includes base stations 120 and a mobile switching center 122. However, these implementations are provided for purposes of illustration, In fact, other network types and arrangements are within the scope of the present invention.

Backbone network 110 is also used for the accumulation of links by access point 106. For instance, each service provider 108 may transmit information regarding its services to access point 106 via backbone network 110. This information includes links that may be collected by WCD 102. In addition, backbone network 110 may be used by WCD 102 to obtain services from service providers 108 based on links received from access point 106.

II. Wireless Communications Device

Figure 2:
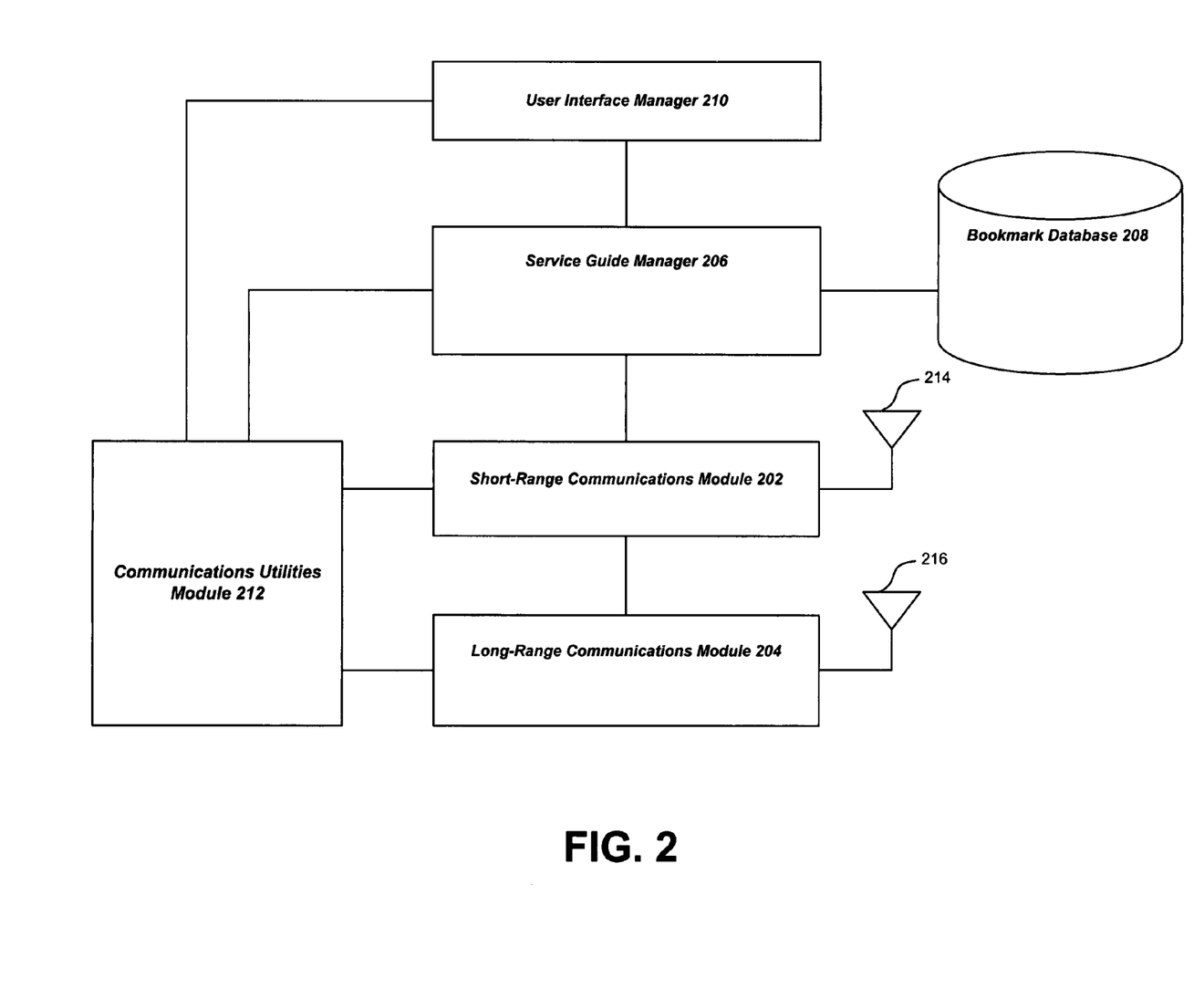
FIG. 2 is a block diagram of an exemplary communications device architecture.

FIG. 2 is a block diagram showing an exemplary wireless communications device architecture, which may be used for WCD 102. While FIG. 2 illustrates a particular device architecture, other architectures are within the scope of the present invention. The architecture of FIG. 2 includes a short-range communications module 202, a long-range communications module 204, a service guide manager 206, a bookmark database 208, a user interface manager 210, and a communications utilities module 212.

Short-range communications module 202 is responsible for functions involving the exchange of information across short-range wireless connections via an antenna 214. As described above, examples of such connections include Bluetooth, WLAN, and UWB connections. Accordingly, module 202 performs functions related to the establishment of short-range connections, as well as processing related to the transmission and reception of information via such connections. Also, module 202 may perform functions related to RFID communications. For instance, module 202 may control the generation of RF signals for activating RFID transponders. In addition, module 202 may control the reception of signals from RFID transponders.

Long-range communications module 204 performs functions related to the exchange of information across longer-range communications networks (such as cellular networks) via an antenna 216. Therefore, long-range communications module 204 may operate to establish data communications sessions, such as General Packet Radio Service (GPRS) sessions and/or Universal Mobile Telecommunications System (UMTS) sessions. Also, long-range communications module 204 may operate to transmit and receive messages, such as short messaging service (SMS) messages and/or multimedia messaging service (MMS) messages.

FIG. 2 shows that service guide manager 206 is coupled to short-range communications module 202. Service guide manager 206 provides for the management and storage of links received from remote devices, such as access point 104. Such remote devices are referred to herein as service points. These received links may be in various forms. One such form is a service bookmark. However, other forms are within the scope of the present invention.

Service guide manager 206 may operate as a background process. This allows for the collection of links (e.g., service bookmarks) to services without interrupting the user's operation of the device. Over time, the device collects new service links. However, in order to handle the device's memory constraints, new service links cannot be collected indefinitely without deleting older service links.

Upon receipt, service guide manager 206 may process and store such links in bookmark database 208. Bookmark database 208 provides for the storage of links (such as service bookmarks). These links may be stored in various folders, where each folder corresponds to a particular menu.

Examples of such folders include a dynamic folder, a recent folder, and a saved folder. The dynamic folder is for storing received service bookmarks. The recent folder is for storing service bookmarks that were recently activated. The saved folder is for storing service bookmarks selected for storage by a user (e.g., favorites). In embodiments, of the present invention, each folder may have a specified maximum number of service links (e.g., service bookmarks) that may be stored. An exemplary maximum number of service bookmarks is ten.

In addition to storing links, bookmark database 208 may also store categorical information, such as keywords. The categorical information may be mapped to the stored links. This advantageously helps a user perform topical searches for particular links. Such categorical information may accompany links when they are received from service points.

Service guide manager 206 is also coupled to a user interface manager 210. User interface manager 210 provides functionality, such as a graphical user interface, for the presentation of links to users. In addition, this functionality provides for user selection and activation of links.

As shown in FIG. 2, service guide manager 206 is also coupled to communications utilities module 212, which provides for the establishment of service sessions using long-range communications module 204 and/or short-range communications module 202. Communications utilities module 212 may include various components that allow the reception of services from remote devices according to protocols, such as the Wireless Application Protocol (WAP).

When engaging in WAP communications with a remote server, the device functions as a WAP client. To provide this functionality, module 212 may include WAP client software having components, such as a Wireless Markup Language (WML) Browser, a WMLScript engine, a Push Subsystem, and a Wireless Protocol Stack.

Applications (not shown) may interact with the WAP client software to provide a variety of communications services. Examples of such communications services include the reception of Internet-based content, such as headline news, exchange rates, sports results, stock quotes, weather forecasts, multilingual phrase dictionaries, shopping and dining information, local transit (e.g., bus, train, and/or subway) schedules, personal online calendars, and online travel and banking services.

The WAP-enabled device may access small files called decks which each include smaller pages called cards. Cards are small enough to fit into a small display area that is referred to herein as a microbrowser. The small size of the microbrowser and the small file sizes are suitable for accommodating low memory devices and low-bandwidth communications constraints imposed by wireless links.

Cards are written in the Wireless Markup Language (WML), which is specifically devised for small screens and one-hand navigation without a keyboard. WML is scaleable so that it is compatible with a wide range of displays that covers two-line text displays, as well as large LCD screens found on devices, such as smart phones, PDAs, and personal communicators. WML cards may include programs written in WMLScript, which is similar to JavaScript. However, through the elimination of several unnecessary functions found in these other scripting languages, WMLScript reduces memory and processing demands.

Figure 3:
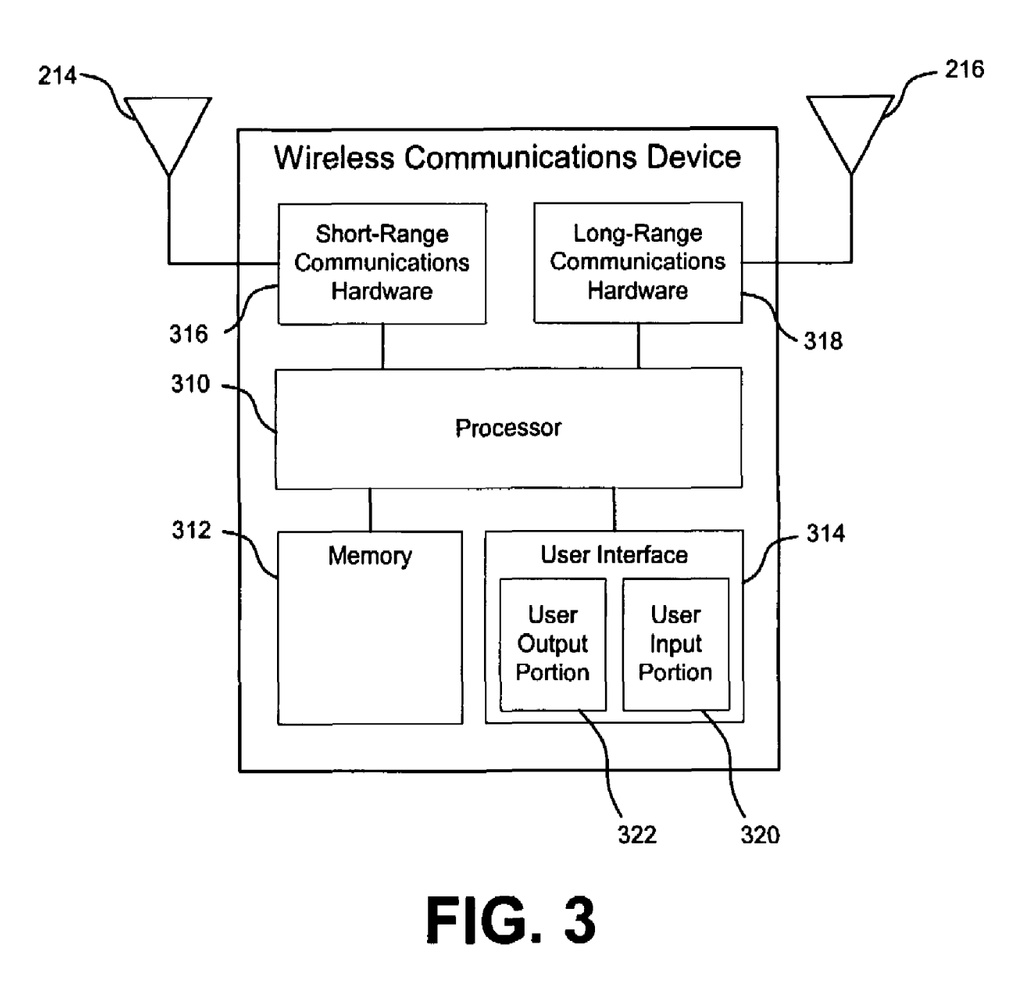
FIG. 3 is a block diagram of an exemplary communications device implementation.

Device architectures, such as the architecture of FIG. 2, may be implemented in hardware, software, firmware, or any combination thereof. One such implementation is shown in FIG. 3. This implementation includes a processor 310, a memory 312, a user interface 314, short-range communications hardware 316, and long-range communications hardware 318. In addition, the implementation of FIG. 3 includes antenna 212 and antenna 214.

Processor 310 controls device operation. As shown in FIG. 3, processor 310 is coupled to hardware portions 316 and 318. Processor 310 may be implemented with one or more microprocessors that are each capable of executing software instructions stored in memory 312.

Memory 312 includes random access memory (RAM), read only memory (ROM), and/or flash memory, and stores information in the form of data and software components (also referred to herein as modules). The data stored by memory 312 may be associated with particular software components. In addition, this data may be associated with databases, such as bookmark database 208.

The software components stored by memory 312 include instructions that can be executed by processor 310. Various types of software components may be stored in memory 312. For instance, memory 312 may store software components that control the operation of hardware portions 316 and 318. Also, memory 312 may store software components that provide for the functionality of communications modules 202 and 204, service guide manager 206, bookmark database 208, user interface manager 210, and communications utilities module 212.

As shown in FIG. 3, user interface 314 is also coupled to processor 310. User interface 314 facilitates the exchange of information with a user. FIG. 3 shows that user interface 314 includes a user input portion 320 and a user output portion 322. User input portion 320 may include one or more components that allow a user to input information. Examples of such components include keypads, touch screens, and microphones. User output portion 322 allows a user to receive information from the device. Thus, user output portion 322 may include various components, such as a display, and one or more audio speakers. Exemplary displays include liquid crystal displays (LCDs), and video displays.

Hardware portions 316 and 318 provide for the transmission and reception of signals. Accordingly, these portions may include components (e.g., electronics) that perform functions, such as modulation, demodulation, amplification, and filtering. These portions may be controlled by communications modules 202 and 204.

The elements shown in FIG. 3 may be coupled according to various techniques. One such technique involves coupling hardware portions 316 and 318, processor 310, memory 312, and user interface 314 through one or more bus interfaces. In addition, each of these components is coupled to a power source, such as a removable and/or rechargeable battery pack (not shown).

III. Operation

Figure 4:
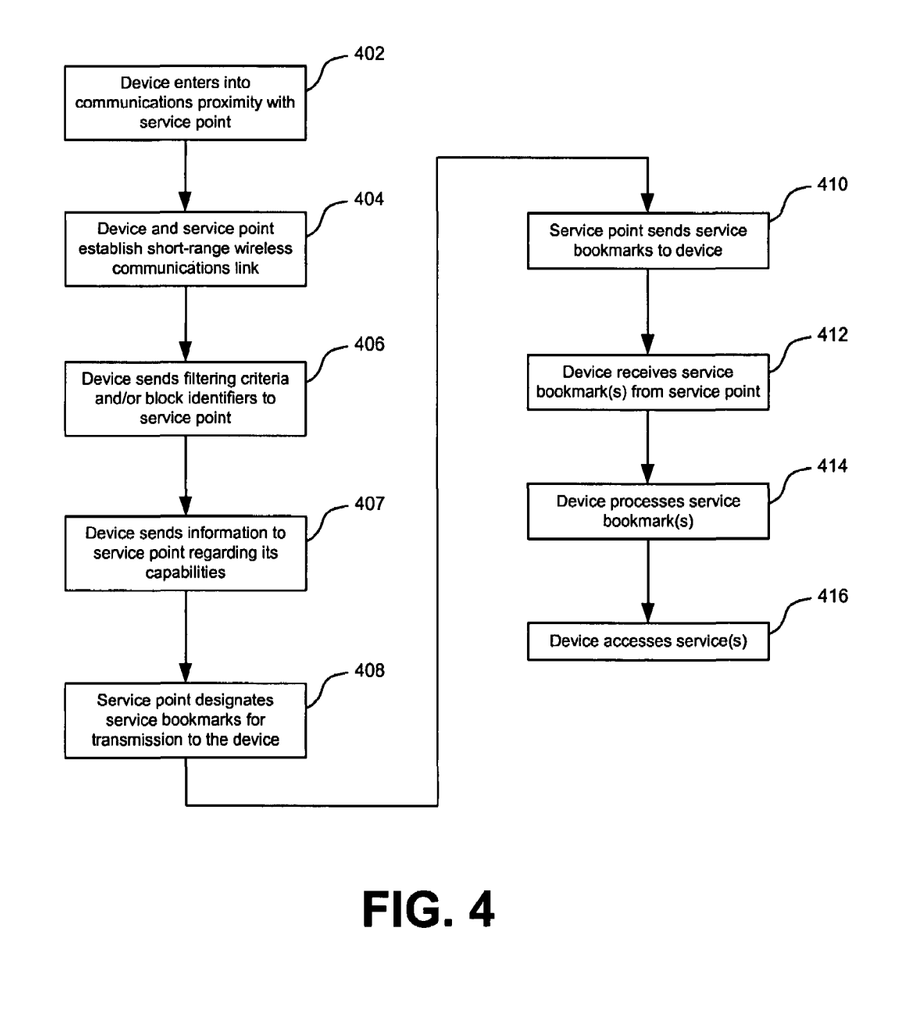
FIGS. 4 and 5 are flowcharts illustrating operational sequences according to embodiments of the present invention.

FIG. 4 is a flowchart illustrating an operation according to an embodiment of the present invention. This operation is described with reference to a communications device, such as WCD 102, and a service point, such as access point 104.

In a step 402, the device enters communicating range with the service point. For example, with reference to the environment of FIG. 1, this step may involve WCD 102 entering coverage area 106. In a step 404, the device and the service point establish a short-range wireless communications link. As described above, this link may employ technologies, such as Bluetooth, WLAN, or UWB. In addition, this link may employ RFID transmissions.

In a step 406, the device may send category keyword i block identifiers to the service point. The sending of category keywords allows for the service point to filter out service bookmarks that does not interest the user. Block identifiers indicate particular service bookmarks that the user does not desire to receive. In embodiments, the block identifier includes service provider and service number identifiers.

In a step 407, the device may send information to the service point regarding its capabilities. For instance, step 407 may comprise the device informing the service point its model, display size, communicatons capabilities, etc. This information allows the service point to make a capability based filtering so that useless service links are not sent to the device. For example, if the device is not capable of WAP access, then there is no use in sending the device, service links for WAP-based services.

Steps 406 and 407 are optional. However, in embodiments of the present invention, one or both of these steps are performed. However, in some embodiments, step 406 is not performed. This advantageously allows the device to remain "incognito" to the service point because the service point do not receive any information regarding its preferences.

In a step 408, the service point service designates service bookmarks for transmission to the device. This designation includes filtering and blocking according to any keywords and/or block identifiers sent by the device in step 406.

In a step 410, the service point sends service bookmarks to the device. The device receives these bookmarks in a step 412. In a step 414 the device processes the service bookmarks. Exemplary performances of this step are described below in greater detail with reference to FIG. 5.

In a step 416, the device may access one or more services through its links. As described above, this step may involve establishing a long range wireless communications session with a service provider. Step 416 involves user interaction with the device. In contrast, the other steps of FIG. 4 may be automatically performed by the device. This automatic performance, may be as a background process.

Figure 5:
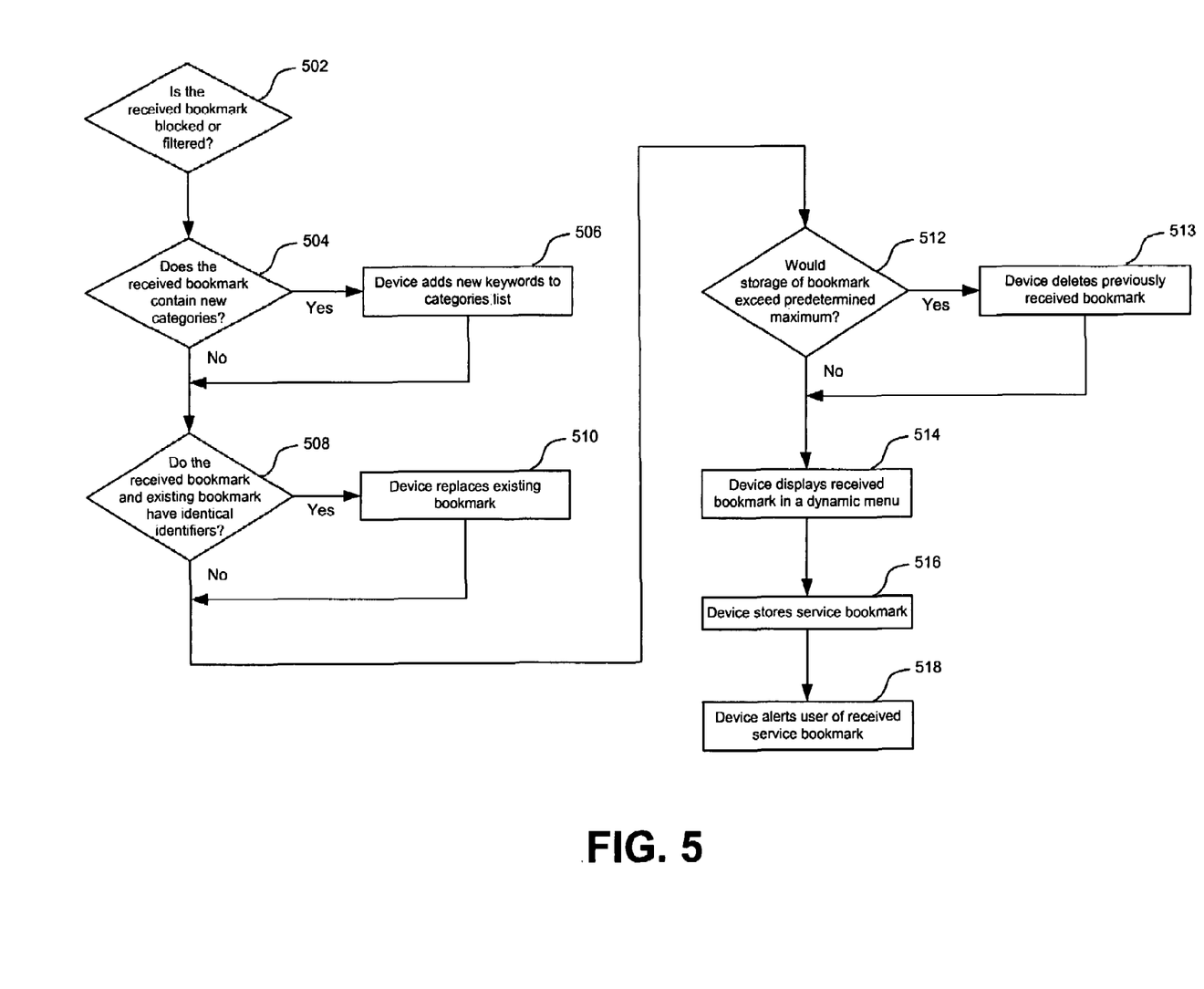

FIG. 5 illustrates an operation of bookmark processing according to embodiments of the present invention. This operation may be performed for each service bookmark that the device receives from the service point. Accordingly, the steps of FIG. 5 are described with reference to a received service bookmark.

This operation includes a step 502, which may be performed in conjunction with step 406 or as an alternative to step 406. In this step, the device determines whether the received service bookmark is blocked and/or filtered. If not, then operation proceeds to a step 504.

In step 504, the device determines whether the received service bookmark contains any new categories (i.e., one or more keywords). If so, then a step 506 is performed in which the device adds the new keyword(s) to its category list. With reference to the architecture of FIG. 2, the category list may be stored in bookmark database 208.

In a step 508, the device determines whether the received service bookmark has an identifier that is identical with an existing service bookmark currently being stored by the device. If so, then a step 510 is performed. Otherwise, operation proceeds to a step 512. In step 510, the device updates (i.e., replaces) the existing service bookmark with the received service bookmark in a step 510. In embodiments, this replacement is performed regardless of the storage location (e.g., a saved folder, a recent folder, or a dynamic folder) of the existing service bookmark.

In step 512, the device determines whether storage of this new service bookmark would exceed a predetermined maximum number of service bookmarks. This maximum number may be associated with a particular menu, such as a dynamic menu for the presentation of the most recently received bookmarks. In embodiments, this maximum number may be user-defined.

If storage of the received service bookmark would exceed the maximum number, then a step 513 is performed. In step 513, a stored bookmark is removed from the device (i.e., deleted). The deleted bookmark may be based on one or more predetermined criteria. Examples of such criteria, include such first in first out (FIFO), service link categories, and service bookmark validity times.

In a step 514, the device displays the received service bookmark in a dynamic menu. In embodiments, the received service bookmark is displayed in a first position in the dynamic menu. In a step 516, the device stores the received bookmark in a manner that corresponds to its position in the menu.

In a step 518, the device may alert its user if new or updated service bookmarks were added to the menu in either of steps 510 or 518. Additionally, when a service bookmark is received, the device may check the validity of its service (through, for example validity information 610). If the service is invalid, the device may delete the service bookmark and not display it.

Although FIGS. 4 and 5 are described with reference to service bookmarks, the techniques of the present invention may be employed with other forms of data. For instance, these techniques may be performed with various arrangements of links and corresponding meta-data. Moreover, such techniques may be performed with bare links.

IV. Service Bookmark

Figure 6:
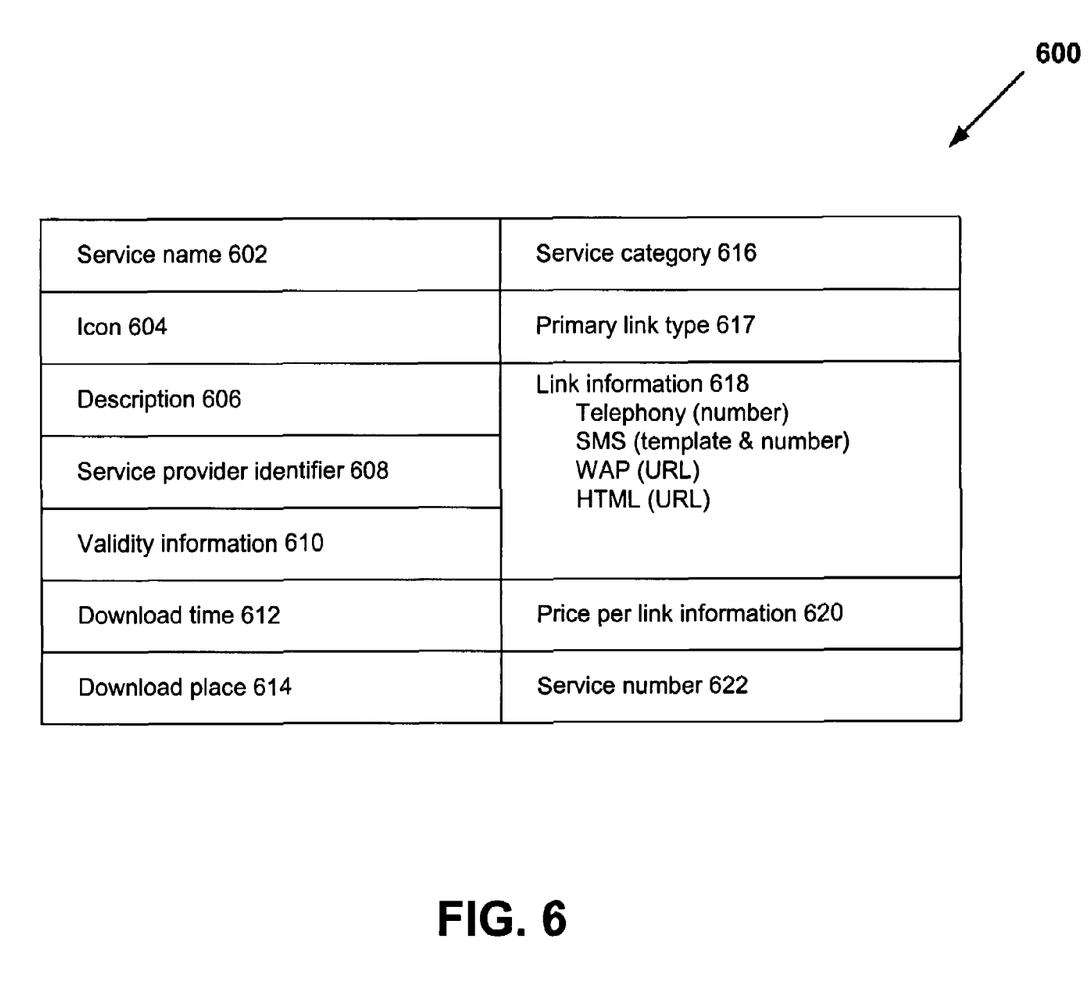
FIG. 6 is a diagram of an exemplary service bookmark.

FIG. 6 is a diagram of an exemplary service bookmark 600, according to an embodiment of the present invention. As shown in FIG. 6, bookmark 600 includes various information. In particular, service bookmark 600 includes a service name 602, an icon 604, a description 606, a service provider identifier 608, validity information 610, a download time 612, a download place 614, a service category 616, a primary link type 617, link information 618, price per link type information 620, and a service number 622. This information may be encoded in various formats, such as in the extensible markup language (XML).

Service name 602 provides a name of the service associated with service bookmark 600. This may be encoded as text. Icon 604 encodes a graphical representation that can be displayed by a device and activated by its user. Description 606 includes information (e.g., text and/or graphics) explaining the service associated with bookmark 600.

As a device moves from location to location, the contents of service bookmarks that correspond to a particular service can change over time. However, from the user perspective, the service is still the same. In order to recognize which service bookmarks refer to same service, embodiments of the present invention provide for service bookmarks having the same unique identifiers when they are associated with the same service. Therefore, as described above with reference to steps 508 and 510 of FIG. 5, a device may replace an existing stored service bookmark with a more recently received service bookmark. This replacement may be performed when the more recently received service bookmark has an identifier that is identical to the identifier of the existing service bookmark.

Such a unique identifier can be implemented in various ways. For example, with reference to service bookmark 600, a unique identifier can be provided by service provider 608 and service number 622. Service provider identifier 608 is used to differentiate a particular service provider from other service providers in a manner that is similar to the way different domains are identified in an Internet Protocol environment. Service number 622 is an identifier of the service provided by the service provider indicated by identifier 608.

By using the unique identifier, a service provider can control which services are updated and which are presented as new ones. For example, a local weather report can be defined as unique for each location. Alternatively, by using the same identifier, a service provider may cause new weather report bookmarks to replace existing ones.

Validity information 610 provides information regarding the validity of the service corresponding to bookmark 600. A device may use this information to check whether the a time-dependent service (e.g., a concert event) is still valid and to determine whether to obtain the service. Bookmarks that are no longer valid may be automatically displayed as invalid (e.g., in grey). Alternatively, bookmarks that are no longer valid may be automatically deleted.

Download time 612 and download place 614 provide information regarding the time(s) and location(s) at which the service is available.

Service category 616 provides categorical information, such as one or more keywords, for the service of bookmark 600. For instance, if the service is a weather report, exemplary keywords include "weather" and "forecast".

Link information 618 provides one or more links (e.g., one or more addresses and/or identifiers) that a device may use to obtain the corresponding service from a remote service provider via a communications network. As shown in FIG. 6, link information 618 may include various types of links. Examples of such links include telephony addresses (e.g., telephone numbers), messaging criteria (e.g., SMS message template and number), and resource identifiers (e.g., WAP and HTML addresses).

Price per link type information 620 provides cost information for obtaining the service of bookmark 600 according to the links provided by link information 618. For example, when multiple links are specified, a device or user may consider prices for each of the specified links to determine the most desirable link for obtaining the service.

V. User Interface

Figure 7A:
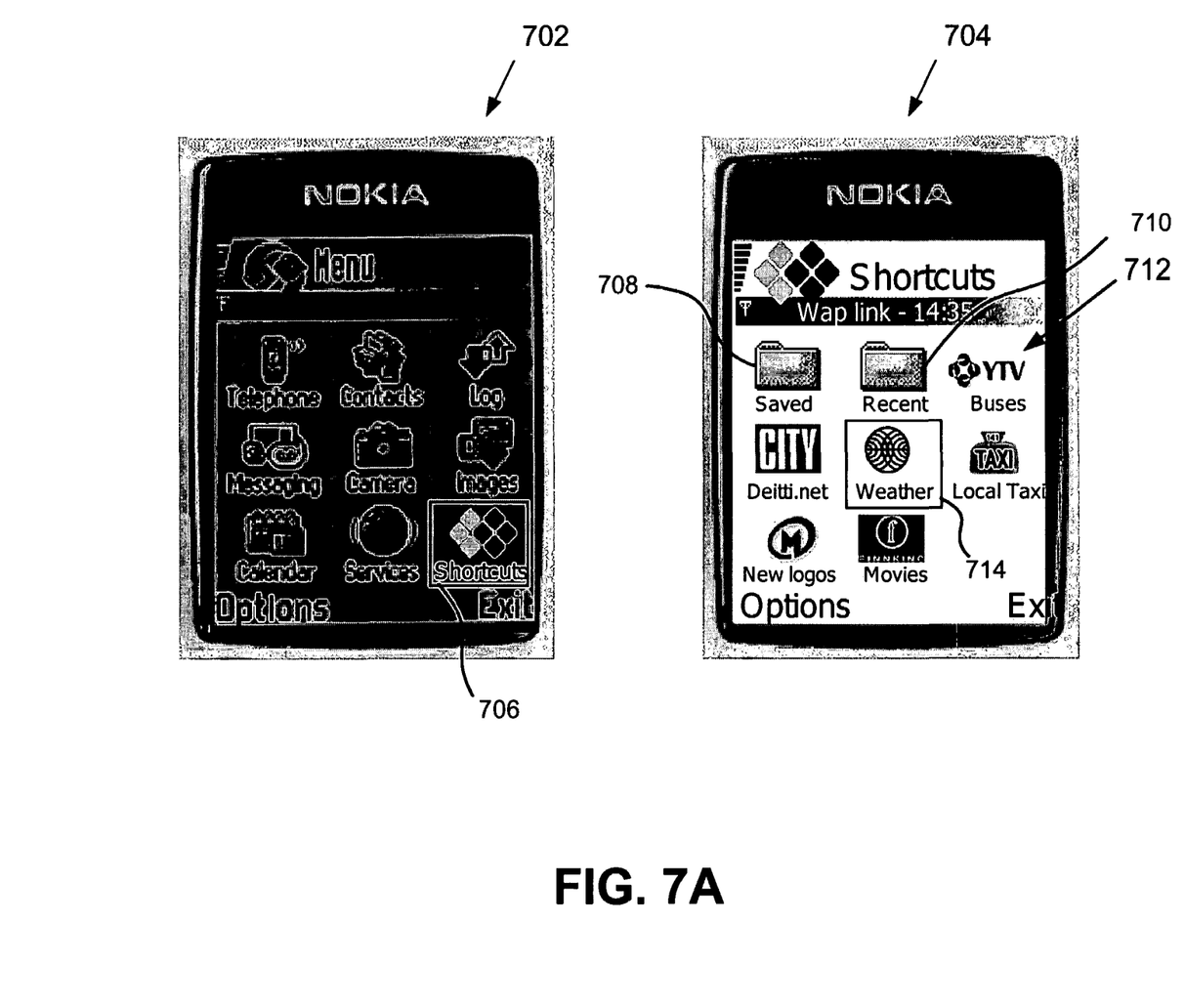
FIGS. 7A and 7B are exemplary user interface diagrams.

FIG. 7A is a diagram of an exemplary user interface, according to an embodiment of the present invention. This user interface includes a high level menu 702 and a sub-menu 704. As shown in FIG. 7A, high-level menu 702 displays multiple graphical icons, such as a shortcuts icon 706.

When a user activates shortcuts icon 706, sub-menu 704 is presented to the user. In the exemplary interface of FIG. 7A, sub-menu 704 displays a saved folder 708, a recent folder 710, and multiple icons 712. Each of icons 712 represents a particular service bookmark. For instance, icon 714 represents a service bookmark for a weather reporting service. Collectively, icons 712 are grouped in a dynamic folder. Hence, the display of these icons in sub-menu 704 constitutes a dynamic menu. The device may store the bookmarks of this dynamic folder, for example, in bookmark database 208.

From sub-menu 704, a user may activate saved folder 708 and/or recent folder 710. Upon activation of either, a menu of corresponding bookmarks (not shown) is presented to the user. The device may store the bookmarks of such folders, for example, in bookmark database 208.

When a user activates a service bookmark, communications with a remote service provider (such as one of service providers 108) is initiated. In particular, such communications may involve the initiation of a session with the service provider according to a link of the activated service bookmark (e.g., link 618). In embodiments, such communications involve the utilization of longer-range wireless (e.g., cellular) networks.

Figure 7B:
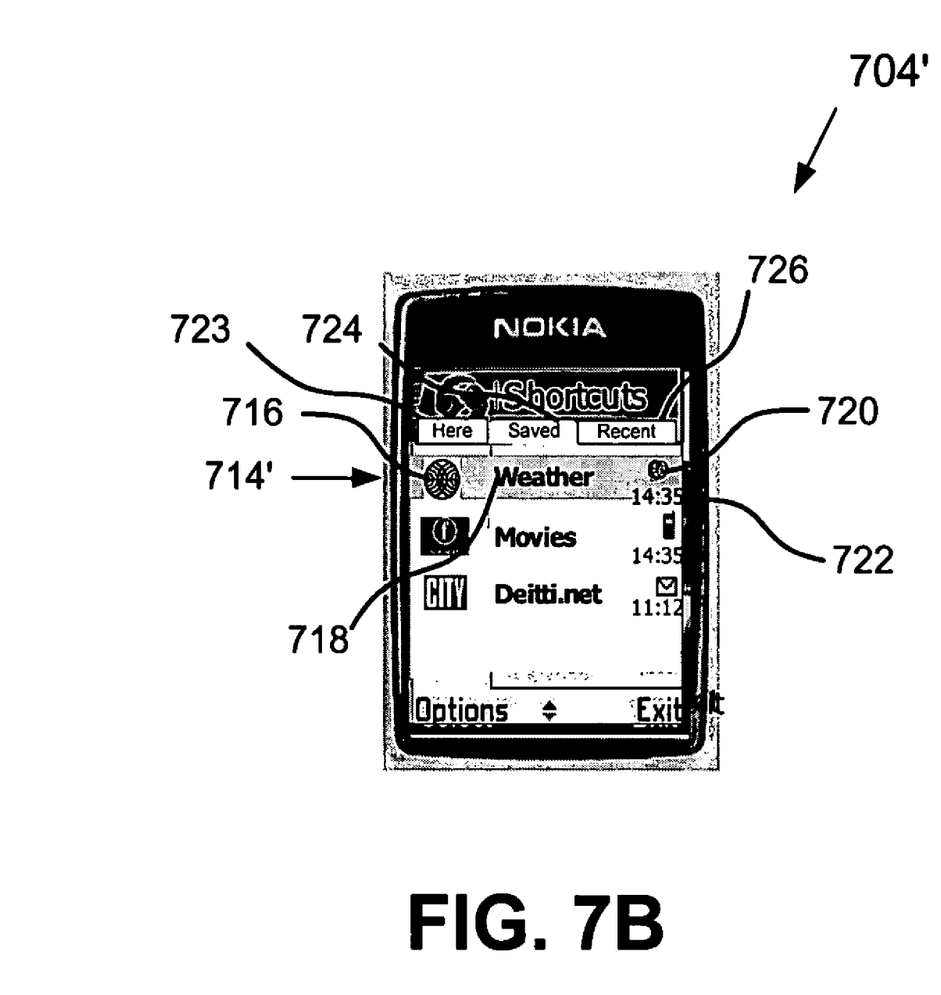

FIG. 7B is a further diagram of an exemplary user interface, according to an embodiment of the present invention. In particular, FIG. 7B shows an alternative presentation of sub-menu 704, which is shown as sub-menu 704'. Sub-menu 704' constitutes a dynamic menu (indicated as "here"). This dynamic menu includes a service bookmark indicator 714', which represents a service bookmark for a weather reporting service. As shown in FIG. 7B, indicator 714' includes an icon 716, a textual service/bearer type description 718 (e.g., a keyword, such as "weather"), a session type indicator 720 (e.g., WAP, HTML, SMS, e-mail, etc.), and a time of bookmark receipt 722. In addition, sub-menu 714' includes tabs 723, 724, and 726. These tabs enable a user to navigate between displays of dynamic, recent, and saved menus.

As described above, the user interface of FIGS. 7A and 7B may display items, such as service bookmarks and folders, in the form of icons. However, other techniques may be employed to display such items. Examples of such techniques include the employment of text or alternative graphical representations. User activation of these items may be performed through, for example, interaction of a keypad, buttons, and/or a touch screen.

VI. Menu Processing

Figure 8:
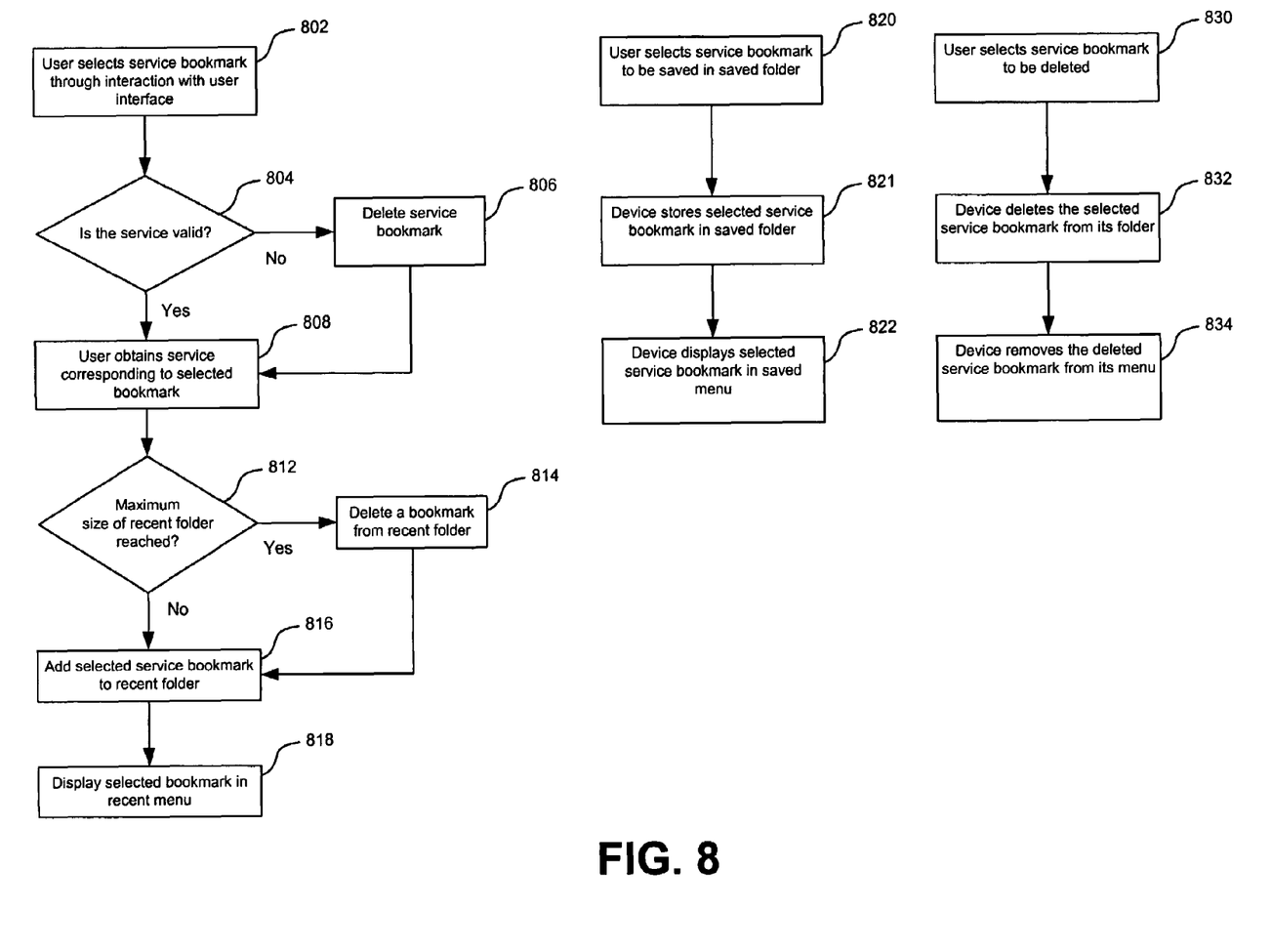
FIG. 8 is a flowchart showing the processing of menu items according to embodiments of the present invention.

FIG. 8 is a flowchart showing an exemplary processing of menu items according to embodiments of the present invention. As shown in FIG. 8, this processing includes a step 802. In this step, a user selects a service bookmark through interaction with the device's user interface. A menu, such as a dynamic menu, or a saved menu may display this service bookmark. Accordingly, the device may store the service bookmark in a folder corresponding to the menu in which it is displayed.

In a step 804, the device checks the validity of the service corresponding to the selected service bookmark. As indicated by a step 806, if this service is not valid, the selected bookmark is deleted. Otherwise, operation proceeds to a step 808.

In step 808, the user obtains the service corresponding to the selected bookmark through interaction with the device's user interface. This step comprises the device initiating a communications session with a remote service provider (such as one of service providers 108) using the link information provided by the selected service bookmark. Accordingly, in step 808, the device may place a telephonic call to a particular number, send an short messaging service (SMS) message or a multimedia messaging service (MMS) message to a particular number in a specified format, establish a General Packet Radio Service (GPRS) session, and/or establish a Universal Mobile Telecommunications System (UMTS) session. Also, in step 808, the device may initiate a client-server session with the service provider, such as a WAP session, a web session, or the like.

In a step 812, the device determines whether the maximum size of its recent folder has been reached. If so, then a step 814 is performed. Otherwise, operation proceeds to a step 816. In step 814, the device deletes one of the entries in its recent folder. In embodiments of the present invention, the oldest item in the recent menu is deleted. In step 816, the device adds the service bookmark selected in step 802 to its recent folder.

In a step 818, the device displays this bookmark in its recent menu. In embodiments of the present invention, this bookmark is displayed as the first item in the recent menu.

In addition to the steps described above, the operation of FIG. 8 may include steps 820–822, which involve the saving of service bookmarks. As shown in FIG. 8, the user may designate a service bookmark to be saved in a saved folder in step 820. This designated bookmark may be in or more other folders (and displayed in their corresponding menus). Accordingly, step 820 includes the user interacting with the device's user interface. In a step 821, the device stores the selected bookmark in its saved folder. In step 822, the device displays this bookmark in its saved menu. In embodiments, this bookmark is displayed as the first item in the saved menu.

Moreover, the operation of FIG. 8 may include steps 830–834, which involve the deletion of service bookmarks. As shown in FIG. 8, the user designates a service bookmark to be deleted from its folder in step 830. This designated bookmark may be in or more other folders (and displayed in their corresponding menus). Accordingly, step 830 includes the user interacting with the device's user interface. In step 832, the device deletes this service bookmark from its folder. Accordingly, in step 834, the display of this bookmark in the corresponding menu is removed.

Although steps 802–818, 820–822, and 830–834 are shown as being separate. These steps may be performed together in various sequential orders and/or in parallel. Moreover, variations from the sequential order of steps depicted in FIG. 8 are within the scope of the present invention.

VII. Conclusion

While various embodiments of the present invention have been described above, it should be understood that they have been presented by way of example only, and not in limitation. For instance, although examples have been described involving Bluetooth, WLAN, and UWB short-range communications and cellular longer range communications, other short-range and longer-range communications technologies are within the scope of the present invention.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method, comprising:
   (a) receiving a remote service link across a short-range wireless communications network, the service link corresponding to a service provided by a remote service provider, wherein the received remote service link is included in a data structure comprising an identifier corresponding to the received remote service link;
   (b) said remote service link including a download time information and a download place information regarding the time and location at which said service is available;
   (c) storing the received remote service link; and
   (d) displaying a representation of the received remote service link, including the time and location at which said service is available.

2. The method of claim 1, wherein step (c) comprises storing the received remote service link in a folder corresponding to received remote service links.

3. The method of claim 2, wherein step (d) comprises displaying the representation of the received remote service link in a menu corresponding to the folder.

4. The method of claim 1, further comprising:
   (e) accessing the service through a user-initiated activation of the remote service link.

5. The method of claim 4, which further initiating a communications session with the remote service provider, wherein the communications session employs a cellular communications network.

6. The method of claim 5, further comprising:
   (f) storing the received remote service link in a folder corresponding to recently activated remote service links in response to establishment of the communications session with the remote service provider.

7. The method of claim 4, further comprising:
   (h) displaying the representation of the received remote service link in a menu corresponding to the folder.

8. The method of claim 1, wherein the identifiers each include an identifier of the service provider and an identifier of the service.

9. The method of claim 1, wherein step (d) comprises displaying an icon corresponding to the service.

10. The method of claim 9, wherein step (d) further comprises displaying a service type description.

11. The method of claim 1, wherein the remote service link includes a telephone number.

12. The method of claim 1, wherein the remote service link includes a wireless access protocol (WAP) resource identifier.

13. The method of claim 1, wherein the remote service link includes a hypertext markup language (HTML) resource identifier.

14. The method of claim 1, wherein the remote service link includes a short messaging service (SMS) message format and destination number.

15. The method of claim 1, wherein the short-range wireless communications network is a Bluetooth network.

16. The method of claim 1, wherein the short-range wireless communications network is a WLAN network.

17. The method of claim 1, wherein the short-range wireless network employs ultra wideband (UWB) transmissions.

18. The method of claim 1, wherein the short-range wireless network employs radio frequency identification (RFID) transmissions.

19. A method, comprising:
   (a) receiving a remote service link and an identifier corresponding to the remote service link across a short-range wireless communications network, the remote service link and identifier corresponding to a service provided by a remote service provider;
   (b) said remote service link including a download time information and a download place information regarding the time and location at which said service is available; and
   (c) displaying a representation of the received remote service link, including the time and location at which said service is available.

20. The method of claim 19, further comprising:
   deleting a previously stored remote service link when a maximum number of stored service links is reached.

21. The method of claim 19, wherein step (c) comprises displaying an icon corresponding to the service.

22. The method of claim 19, wherein step (c) comprises displaying a service type description.

23. The method of claim 19, which further comprises storing the received remote service link in a folder corresponding to received remote service links.

24. The method of claim 23, wherein step (c) comprises displaying the representation of the received remote service link in a menu corresponding to the folder.

25. The method of claim 19, further comprising:
accessing the service through a user-initiated activation of the remote service link.

26. The method of claim 25, wherein said accessing step comprises initiating a communications session with the remote service provider, wherein the communications session employs a cellular communications network.

27. The method of claim 26, further comprising:
storing the received remote service link in a folder corresponding to recently activated remote service links in response to establishment of the communications session with the remote service provider.

28. The method of claim 26, further comprising:
displaying a representation of the received remote service link in a menu corresponding to the folder.

29. The method of claim 19, wherein the remote service link includes a telephone number.

30. The method of claim 19, wherein the remote service link includes a wireless access protocol (WAP) resource identifier.

31. The method of claim 20, wherein the remote service link includes a hypertext markup language (HTML) resource identifier.

32. The method of claim 19, wherein the remote service link includes a short messaging service (SMS) message format and destination number.

33. The method of claim 19, wherein the short-range wireless communications network is a Bluetooth network.

34. The method of claim 19, wherein the short-range wireless communications network is a WLAN network.

35. The method of claim 19, wherein the short-range wireless network employs ultra wideband (UWB) transmissions.

36. The method of claim 19, wherein the short-range wireless network employs radio frequency identification (RFID) transmissions.

37. A mobile terminal, comprising:
a display;
a wireless short-range communication module;
a memory having program code stored therein;
a processor disposed in communications with the memory for carrying out instructions in accordance with the stored program code;
wherein the stored program code, when executed by the processor, causes the processor to perform:
receiving a remote service link across a short-range wireless communications network, the service link corresponding to a service provided by a remote service provider, wherein the received remote service link is included in a data structure comprising an identifier corresponding to the received remote service link,
said remote service link including a download time information and a download place information regarding the time and location at which said service is available; and
displaying a representation of the received remote service link on the display, including the time and location at which said service is available.

38. A system, comprising:
a memory having program code stored therein;
a processor disposed in communications with the memory for carrying out instructions in accordance with the stored program code;
wherein the stored program code, when executed by the processor, causes the processor to perform:
receiving a remote service link and an identifier corresponding to the remote service link across a short-range wireless communications network, the remote service link and identifier corresponding to a service provided by a remote service provider;
said remote service link including a download time information and a download place information regarding the time and location at which said service is available; and
displaying a representation of the received remote service link, including the time and location at which said service is available.

39. A computer program product comprising a computer useable medium having computer program logic recorded thereon for instructing a processor in a wireless communications device, the computer program logic comprising:
program code for enabling the processor to receive a remote service link across a short-range wireless communications network, the service link corresponding to a service provided by a remote service provider, wherein the received remote service link is included in a data structure comprising an identifier corresponding to the received remote service link;
said remote service link including a download time information and a download place information regarding the time and location at which said service is available;
program code for enabling the processor to store the received remote service link; and
program code for enabling the processor to display a representation of the received remote service link, including the time and location at which said service is available.

40. A computer program product comprising a computer useable medium having computer program logic recorded thereon for instructing a processor in a wireless communications device, the computer program logic comprising:
program code for enabling the processor to receive a remote service link and an identifier corresponding to the remote service link across a short-range wireless communications network, the remote service link and identifier corresponding to a service provided by a remote service provider;
said remote service link including a download time information and a download place information regarding the time and location at which said service is available; and
program code for enabling the processor to display a representation of the received remote service link, including the time and location at which said service is available.

41. A method, comprising:
(a) receiving a remote service link across a short-range wireless communications network, the service link corresponding to a time-dependent service provided by a remote service provider, wherein the received remote service link is included in a data structure comprising an identifier corresponding to the received remote service link;
(b) said remote service link including a download time information and a download place information regarding the time and location at which said service is available;
(c) storing the received remote service link; and
(d) displaying a representation of the received remote service link, including the time and location at which said service is available.

* * * * *